United States Patent [19]
Trowbridge

[11] Patent Number: 5,357,656
[45] Date of Patent: Oct. 25, 1994

[54] REPAIR DEVICE FOR STRANDED WIRE FENCE

[76] Inventor: Gerald D. Trowbridge, 34485 Highway 93, St. Ignatius, Mont. 59865

[21] Appl. No.: 131,370

[22] Filed: Oct. 4, 1993

[51] Int. Cl.⁵ .............................................. A44B 13/00
[52] U.S. Cl. .................................. 24/370; 24/131 R; 24/598.8; 411/436
[58] Field of Search ................. 24/370, 371, 372, 373, 24/374, 375, 131 C, 573.4, 598.8, 131 R; 411/427, 436, 438; 174/40 R, 87

[56] References Cited

U.S. PATENT DOCUMENTS

| | | | |
|---|---|---|---|
| 312,105 | 2/1985 | Faivre | 24/573.4 |
| 752,074 | 2/1904 | Jackson | . |
| 1,325,627 | 12/1919 | Dow et al. | 24/598.8 |
| 1,826,564 | 10/1931 | Mix | 24/598.8 |
| 1,909,896 | 5/1933 | Reyburn | 24/573.4 |
| 2,320,067 | 5/1943 | Caughren | 24/370 |
| 2,370,406 | 2/1945 | King | 24/370 |
| 2,890,266 | 6/1959 | Bollmeier | 24/131 C |
| 3,567,267 | 3/1971 | Lechner | 24/374 |
| 4,117,256 | 9/1978 | Williams | 174/40 R |
| 4,157,602 | 6/1979 | Pennell | 24/370 |
| 4,833,921 | 11/1989 | Legerius et al. | 174/87 |
| 4,990,044 | 2/1991 | Kimak | 411/427 |
| 5,023,401 | 6/1991 | Clifton | 174/87 |
| 5,113,037 | 5/1992 | King, Jr. et al. | 174/87 |

FOREIGN PATENT DOCUMENTS 1052142  1/1954  France ........................ 24/131 C Primary Examiner—Victor N. Sakran
Attorney, Agent, or Firm—Keith S. Bergman

[57] ABSTRACT

A repair device to refasten the ends of a broken strand of wire in a fence structure, especially such as a strand of barbed wire. The repair device provides at least two similar releasably interconnectable portions, each having a first medial interconnecting hook defined at a first end of an elongate wire body and a second wire fastening hook defined at the second end of the wire body. A conic wire nut is movably carried on the wire body to receive the second wire fastening hook therein and fasten upon that second hook and a loop of fence wire carried by the hook to interconnect one end of the fence wire with the second end portion of the repair device. The wire nut defines peripherally extending wings to aid manual manipulation and may be formed with a slot or releasably interconnectable portion to allow placement on the wire body after formation. More than two of the repair devices may be joined to each other to span a greater distance between wire ends to be connected.

5 Claims, 1 Drawing Sheet

REPAIR DEVICE FOR STRANDED WIRE FENCE

BACKGROUND OF INVENTION

1. Related Applications

There are no applications related hereto heretofore filed in this or any foreign country.

2. Field of Invention

This invention relates generally to releasably interconnectable elongate repair devices to be used at least in pairs to fasten the ends of a broken wire strand together.

3. Background and Description of Prior Art

Stranded wire fences providing one wire strand or a plurality of sequentially spaced strands supported on plural spaced vertical posts are commonly used for animal barriers, definition of land boundaries and other purposes. The strands of wire in such fence structures commonly are maintained in a taut condition to provide an appropriate barrier, maintain structural integrity, and fulfill other purposes. If the taut condition is not properly maintained, the wire strands and portions of the entire fence may fail their purposes. In many common fence constructions strands forming a fence are movably supported on spaced vertical posts for tightening purposes or otherwise so that if a strand breaks it may move appreciably, not only between two posts proximate to the break, but also for some distance in each direction therebeyond.

The breaking of wire strands by reason of external forces or physical deterioration is a common occurrence in fence structures and may effect a fence structure over substantial areas to destroy or lessen its effectiveness. The repair of a broken wire strand is often difficult as the strand commonly was taut before its breaking and by reason of the general fence structure the broken ends of the wire may not be movable to an overlapping fashion to allow direct fastening by wrapping of one end of the broken strand about the other end. This problem has heretofore been recognized and various repair devices having some length and means at least one end to fasten one of the broken ends of a wire strand have become known. The instant invention provides a new and novel member of this class of repair device for broken wire strands in a fence structure.

The tension under which fence wire strands must be maintained to sustain ordinary forces that they incur, and especially to prevent animals from breaching the barrier, are substantial, often ranging to one hundred pounds or more. Any repair device for broken wire strands must interconnect the ends of the broken wire in a fashion to withstand such forces and the fastening device itself must withstand them, especially when the repair device is to be used other than in temporary fashion and after a broken wire is retightened to its original tension. Various prior repair devices have either not addressed this problem or have not addressed it adequately and have provided repair devices that are no stronger than the wire strands being joined. My invention resolves this problem by providing a compound fastener having two releasably interconnected body elements that are formed of material stronger than the wire fence strands to be interconnected so that the body of the structure and the joinder of the two body parts is stronger than the interconnected wire strand. The device also provides hook-like structures in its end parts on which broken wire strand ends are fastened by looping one or more times about the hooks to provide a strong fastening juncture that has substantially the same strength as a strand of the wire being repaired.

Because of the substantial tension under which fence wire strands are maintained, an effective repair device must provide means for securely fastening each of the ends of broken wire strands so that those ends may not move relative to the repair device after they are fastened. Prior devices often have provided no secure means to fastened ends of wire strands to the repair device but have relied merely upon the manipulation of the wire strand ends by wrapping them upon themselves to fulfill this purpose. Such fastening has often been insecure and commonly allows the overlapped wire strands to move relative to each other and relative to the fastening device, especially over a period of time, to allow tension to lessen in a repaired wire strand over a period of time. My invention alleviates this problem by fastening the broken end of a wire strand in looped fashion about an open hook which is covered by a so-called "wire nut" carried on my fastener and having internal threads with such configuration that the nut is movable over the hook structure. The looped portions of the wire strand to be repaired are engaged in the threads of the wire nut and thereby securely maintained relative to the fastening hook.

Any wire strand repair device to provide practical utility must be of simple operation and must not require the use of ancillary tools or mechanical devices which may not be available. Prior fasteners that have provided integral wire tightening mechanism are distinguishable from the instant fastener which is of a simpler and more economic nature and may be permanently left in the fence if desired. My fastener is of a small nature so that several fasteners may be carried in a small space such as a saddle bag or similar container that is commonly available to a person making emergency fence repairs and my fastener may be installed by manual manipulation without the use of any tools. My fastener provides a body of sufficient length to allow looping of each end of a broken wire strand upon itself to form a loop, and this may be readily accomplished by manual manipulation and without tools. Each portion of my fastener may be separately fastened to one end of the broken wire strand and the two fastener portions then fastened to each other by their medial hook portions. If desired a wire stretcher may be used to aid this function and create more tension in the repaired wire strand than might be created by manual manipulation.

My invention lies not in any one of these features individually, but rather in the synergistic combination of all of the structures of my fastener that necessarily give rise to the functions flowing therefrom as herein specified and claimed.

SUMMARY OF INVENTION

My fence wire strand repair device provides a compound structure having two similar releasably interconnectable portions. Each portion provides an elongate rod-like body defining a first hook in its inner end and a second hook in its outer end, all hooks being configured to be releasably interconnectable with any other hook. Each body portion movably carries a wire nut having the open end at the base of the threaded conic element extending outwardly toward the second hook. The wire nut preferably provides opposed, normally extending wings to aid manual manipulation and preferably defines a slot through the smaller portion or is formed by interconnectable parts to allow placement on the body after formation of both hook ends. The size of the second outer loop of each fastener portion is such as to fit within the larger portion of the wire nut, but larger than the channel of the wire nut to maintain it on the fastener body.

In providing such a device, it is:

A principal object to provide an elongate fence wire strand repair apparatus to extend from immovable interconnection between and releasably interconnect end portions of a broken wire strand.

A further object is to provide such apparatus that fastens the broken ends of a wire strand in a fashion that is substantially as strong as the wire strand itself.

A further object is to provide such apparatus that provides wire nuts to releasably fasten the looped end of a broken wire to prevent motion of the broken portions relative to the fastener.

A still further object is to provide such a device that may be installed without the required use of any auxiliary tools.

A still further object is to provide such a device that is of new and novel design, of rugged and durable nature, of simple and economic manufacture and otherwise well suited for the uses and purposes for which it is intended.

Other and further objects of my fastener will appear from the following specification and accompanying drawings which form a part hereof. In carrying out the objects of my invention, however, it is to be remembered that its accidental features are susceptible of change in design and structural arrangement with only one preferred and practical embodiment of the best known modes being illustrated in the accompanying drawings as is required.

BRIEF DESCRIPTION OF DRAWINGS

In the accompanying drawings which form a part hereof and wherein like numbers of reference refer to similar parts throughout.

DESCRIPTION OF PREFERRED EMBODIMENT

Figure 1:
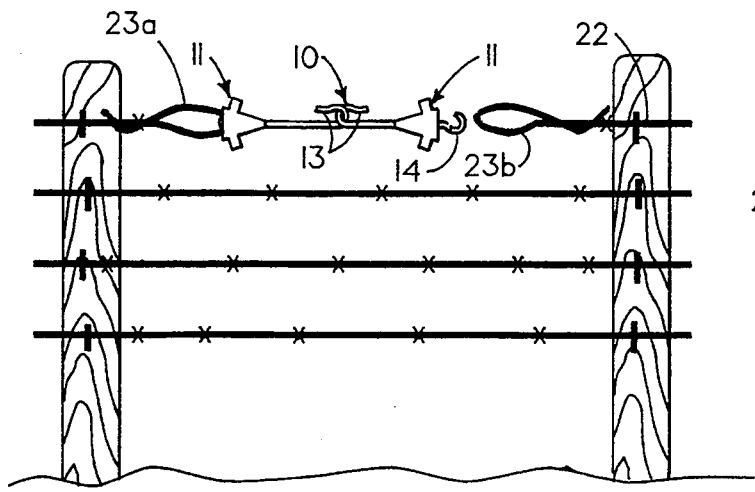
FIG. 1 is an elevational view of the section of a typical stranded wire fence with my invention being placed therein to repair a broken wire strand.

My invention generally provides an elongate repair apparatus for broken wire strands of a fence that has two similar body portions 10 defining hooks at each end and movably carrying wire nut 11 between the end hook portions.

Body 10 provides medial linear portion 12 defining somewhat elongate inner hook 13 at one end and smaller more round outer hook 14 at the other end. The inner hook 13 defines rounded end portion 13a, having an inner diameter somewhat greater than the diameter of the material from which the hook is formed, and elongate overlapping end portion 13b which extends for a distance along the adjacent medial linear portion 12 of the body. The space between the adjacent surfaces of end portion 13b and linear portion 12 of the body s preferably less than the diameter of the material from which the hook is formed, to tend to maintain the hook portion of another body element in fastening engagement therein against accidental dislodgement.

Figure 3:
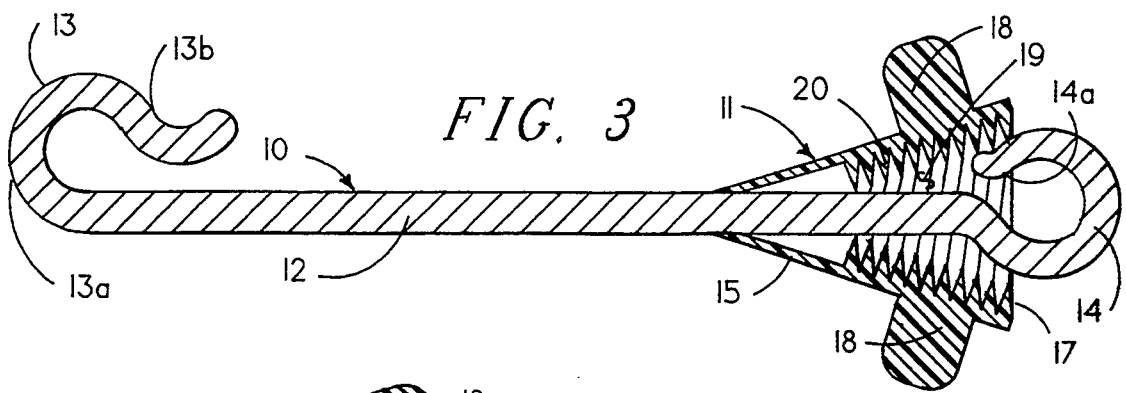
FIG. 3 is an enlarged vertical cross-sectional view of the right portion of the apparatus of FIG. 2, taken on the line 3—3 thereon in the direction indicated by the arrows.

Rounded outer hook 14 preferably is of a generally circular configuration and defines a medial channel somewhat larger than the diameter of the body, but preferably not much larger so that a wire nut that fits over the outer hook will not have to be larger than necessary to accomplish its fastening function. The end portion 14a of hook 14 extends adjacent the outer end of medial portion 12 of the body to again define a channel that preferably is somewhat smaller than the diameter of the material from which the body is formed. Hook 14 is so formed as to be in substantially the same plane as inner hook 13 and preferably in a position so that its center will lie on a line extending through the medial linear portion 12, as seen in FIG. 3.

Body 10 is formed from some semi-rigid, elastically resilient cylindrical material such as mild steel rod or wire stock of appropriate size. The material preferably will be of a size somewhat larger than cross-sectional size of fence wires to be repaired and should have a strength somewhat greater than those wires. For the repair of ordinary stranded barbed fence wire, the body preferably should be formed of mild steel wire of approximately four to eight gauge. Neither the size nor cross-sectional configuration of the material from which the body is formed, however, are essential to my invention and other materials having the required essential characteristics are within the ambit and scope of my invention.

The rounded outer hook 14 preferably defines an annular structure of somewhat greater extent than a semi-circle to allow secure fastening the loop of a fence wire or another repair device therein, but the extent of this arc should leave an appropriate opening through which, with some resilient deformation, a looped wire to be fastened may pass to become engaged in the hook area. The overall length body 10 between hooks 13 and 14 is not critical to my apparatus, but should be sufficient to provide a length of the fastening structure such that when two body portions are joined, the apparatus may be fastened between the ends of a broken fence wire strand with sufficient surplus of that fence wire strand to allow looped fastening about each outer end hook of my fastening apparatus. Normally for most convenient use in ordinary fences, the desired overall length of the body is approximately six inches and the overall length of a complete fastener with two interconnected body portions is approximately twelve inches, though these dimensions may vary and remain within the scope of my invention.

Wire nut 11 provides a peripherally defined, truncated conical body 15 having apex orifice 16 and base orifice 17. The conic body 15 structurally carries two diametrically opposed, perpendicularly extending finger tabs 18 to allow better gripping of the nut to aid its manipulation, particularly in a rotary fashion. The diameter of apex orifice 16 is incrementally larger than the diameter of medial linear portion 12 of the body so that the nut is supported on that portion of the body in a rotatable and slidably movable fashion. The diameter of base orifice 17 is large enough so that the inner open portion of the outer hook 14 may be carried within the medial channel 19 defined by body 15. The length of the wire nut, that is the distance between its apex orifice 16 and base orifice 17 along its axis, is approximately one and one-half times the diameter of the base orifice to provide an appropriate taper for secure fastening of a wire strand therein.

Figure 4:
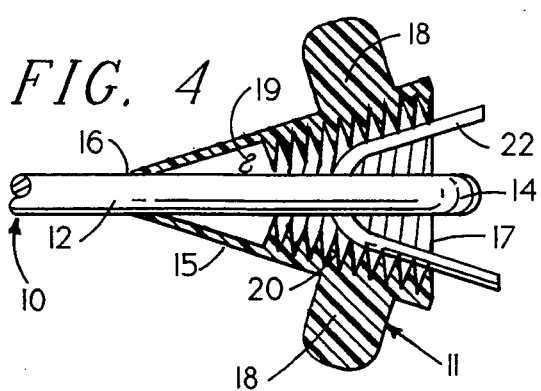
FIG. 4 is a partial cross-sectional view of the right end portion of the fastener of FIG. 3, showing a looped wire strand fastenably interconnected within the wire nut.
Figure 5:
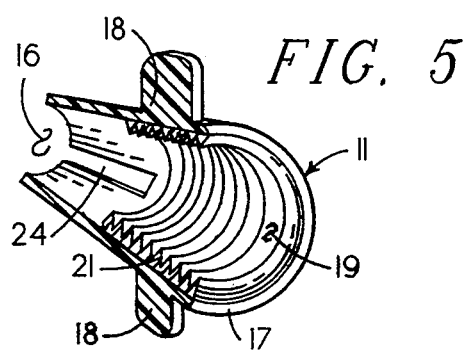
FIG. 5 is a cut-away isometric view of a wire nut showing a separate threaded sleeve structure and a slot that allows placement of the nut on the body portion after formation of the end hooks of the body.

The inner surface of conic body 15 that defines medial channel 19 provides conical threads 20 to function in the fashion of the traditional wire nut to aid in maintaining the inner portion of outer hook 14 and a looped fence wire strand within the channel 19. The threads 20 may be defined as a part of the inner surface of conic body 15, as illustrated in FIGS. 3-4, or they may also be defined by a separate peripherally defined, internally threaded truncated conic structure, as illustrated in FIG. 5. This latter structure is particularly advantageous when conic body 15 is formed of plastic material as that material may not be strong and rigid enough to provide appropriate fastening of wires, but yet is of a lower cost than a wire nut formed completely of metal. In the structure of FIG. 5, the truncated conic body may be formed of plastic and the threaded conic element 21 may be formed of metal with the two subsequently joined by adhesion or other material joining methods. The nature of the threads 20 is not essential to my invention and the known principles of wire nuts operate in my invention as they do in wire nuts generally.

It is to be noted that wire nut 11 of FIGS. 1-4 is placed on the medial portion 12 of my fastener before formation of both the hooks 13, 14 to provide a fastening structure that may not be non-destructively disassembled.

A first type of wire nut that may be placed on the fastener body after formation of both end hooks is illustrated in FIG. 5. An elongate slot 24 is defined in the conic surface, with a width incrementally larger than the diameter of body 10, in orientation parallel to the axis of the conic nut, and an axial length sufficient to allow the nut to be placed on the medial body 12 by moving it inwardly over rounded outer hook 14. This slotted form of the wire nut may provide somewhat less rigidity and strength than the unslotted species.

Figure 6:
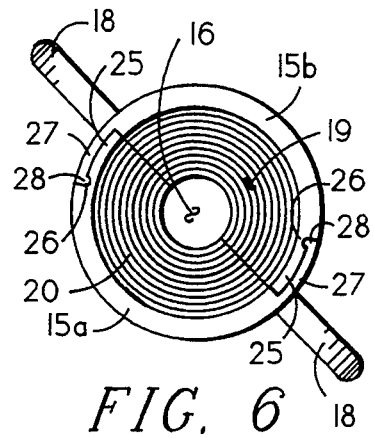
FIG. 6 is an orthographic end view of a wire nut formed with two releasably interconnected portions to allow placement on my fastener body after formation of the end hooks.

A second type of split wire nut that may be placed on a completely formed wire fastener body is illustrated in FIG. 6. This nut provides a conical body formed by similar portions 15a and 15b each defining outer overlapping joint portion 27 at a first linear edge and inner overlapping joint portion 25 at its second linear edge to allow releasable interconnection about a fastener body. This type of wire nut is formed of resilient deformable metal having some resiliency and maintained in releasable interconnection by fastening protuberances 28 and complimentary indentations 26.

Having described the structure of my wire fastener, its operation may be understood.

Figure 2:
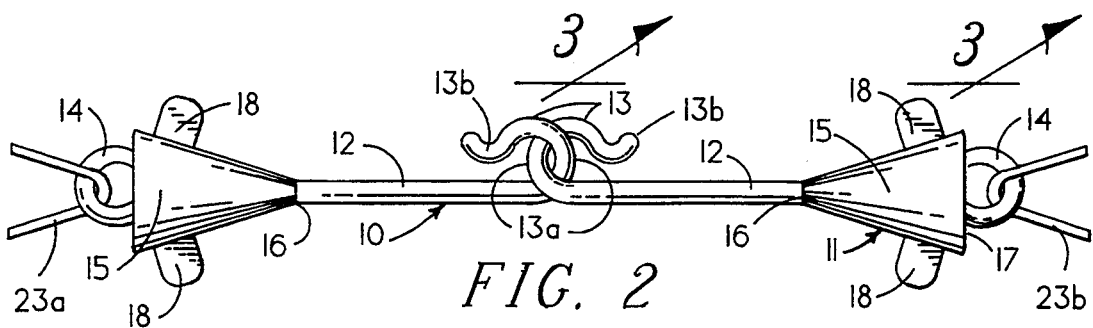
FIG. 2 is a somewhat enlarged orthographic side view of the fastening apparatus of FIG. 1, showing its various parts, their configuration and relationship.

A complete fastener unit comprises two similar portions, each consisting of a body 10 and wire nut 11, as illustrated in FIG. 2. To repair a broken fence wire, as illustrated in FIG. 1 of the drawings, a loop 23a is formed in the left end of a wire 22 to be repaired. This loop 23a is formed by bending the end portion of the broken wire upon itself and wrapping the end portion upon the wire strand to maintain the looped configuration. The rounded outer hook 14 of the left fastener portion is then inserted through left loop 23a of the broken wire 22, as illustrated particularly in FIG. 2. The associated wire nut 11 is then manually moved over the area of interconnection of wire loop 23a with the left fastener hook 14 until sliding motion of the wire nut is resisted. The wire nut is then manually manipulated by turning it, as aided by finger engagement with finger tabs 18, so that threads 20 in the nut engage the enclosed portions of loop 23a and hook 14, and the nut is tightened so that the looped wire is securely fastened within the wire nut and it covers the open portion of outer hook 14.

The right end of broken wire 22 is then looped upon itself to form right loop 23b and the end portion of the wire is wrapped around the wire body to secure and maintain the loop. The right body portion of the fastener is then fastened to the right loop 23a in the same fashion as described for the left loop, and the wire nut 11 on the right fastener portion is tightened to fasten about the interconnection of the right hook and wire loop 23b.

In this condition, with one end portion of my fastener fastened to each of the end portions of broken wire 22, the inner portions of both fasteners are moved toward each other and manually manipulated until their inner hooks 13 are fastenably engaged in the fashion illustrated in FIG. 2. The fastener in this state interconnects the end portions of the broken wire strand 22 being serviced. After fastening of the broken wire, desired tension may be re-established in it by the various known methods. In the original fastening, the distance between the two loops 22a and 22b may be adjusted in forming the loops, before the fastener is applied to those loops to regulate tension to some degree. After the fastener is applied, tension may be re-established in the repaired wire strand by mechanical fence tighteners, by further manipulation of loops 22a and 22b, or by various other tightening methods that have heretofore became known for the tightening stranded wire in a fence.

It is to be noted that the two body portions of my fastener may be interconnected with each other, one end of the device fastened to one end of a broken wire and the other end of the broken wire fastened lastly so that the size and position of the loop may be adjusted to predetermine the tension in the wire strand after its repair.

It is also to be noted that if a repair device that is longer than two interconnected fasteners is required, a plurality of individual fasteners may be interconnected to provide the longer fastener structure. In such a longer fastening structure either end of a fastener may be interconnected with either end of an adjacent fastener since the configuration of the entry channels of the loops tends to prevent accidental dislodgement when the fastener is not under tension.

It is further to be noted that one or s plurality of my fasteners may be used as an independent tension element, such as an angulated gate support, in fence structures or elsewhere, if desired.

The foregoing description of my invention is necessarily of a detailed nature so that a specific embodiment of its best mode might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A repair device for a broken fence wire, comprising in combination:
    a fastener having two similar releasably interconnectable portions, each portion having a medial linear body, a first outer hook opening inwardly towards the body to interconnect the end portion of a fence wire and a second inner hook opening inwardly toward the body to releasably interconnect with the other fastener portion; and
    wire nuts carried by each body portion, each wire nut having a body with means to aid manipulation, and defining a medial conical channel having an orifice at its apex to movably fit upon the medial linear body of each fastener and an orifice at its base to fit over at least the body facing open portion of the outer hook and fasten a fence wire connected to the outer hook.

2. The repair device of claim 1 wherein
    the fastener portions are formed of rigid cylindrical material having tensile strength greater than a the tensile strength of a broken fence wire to be repaired.

3. The repair device of claim 1 wherein
    the wire nut defines an elongate slot extending a spaced distance toward its base from its apex orifice to allow placement on the fastener body after formation of the first and second hooks defined in each end thereof.

4. The repair device of claim 1 wherein
    the wire nut provides a peripherally defined truncated conic body formed by two portions each having edges co-planar with the conic axis with each edge defining means to releasably fasten the two similar portions to each other to allow placement on the fastener body after formation of the hooks defined at each end thereof.

5. A repair device for a broken wire of a fence structure, comprising two similar fastening portions interconnected in their adjacent medial ends, each fastener portion having:
    an elongate body formed of semi-rigid cylindrical rod with a medial linear portion, a first inner hook defined in the first inner end of the body to interconnect the first hook of another body portion, and a second outer book defined in the other outer end of the body to interconnect one end of a broken fence wire, each said hook opening toward the other hook; and
    a wire nut, slidably carried by the medial body portion, having
        a peripherally defined truncated conic body defining a conic channel extending axially therethrough with a smaller inwardly facing apex orifice and a larger outwardly facing base orifice, the surface of the conical channel defining threads to fastenably engage a looped portion of a wire carried therein, said channel being of a size to allow at least the inner portion of the second outer hook to be carried in the outer portion thereof.

* * * * *